United States Patent [19]
Shaffer

[11] Patent Number: 6,089,204
[45] Date of Patent: Jul. 18, 2000

[54] COMBINED AXIAL AND TORSIONAL CRANKSHAFT VIBRATION DAMPER FOR RECIPROCATING ENGINE

[75] Inventor: Bradley J. Shaffer, Romney, Ind.

[73] Assignee: Caterpillar, Inc., Peoria, Ill.

[21] Appl. No.: 09/392,025

[22] Filed: Sep. 8, 1999

[51] Int. Cl.[7] ............................................ F02B 75/06
[52] U.S. Cl. ............................................ 123/192.1; 74/574
[58] Field of Search ............................ 123/192.1; 74/574

[56] References Cited

U.S. PATENT DOCUMENTS

| | | | |
|---|---|---|---|
| 1,928,119 | 9/1933 | Vargha | 74/574 |
| 3,670,593 | 6/1972 | Troyer | 74/574 |
| 4,671,227 | 6/1987 | Hollerweger et al. | 123/192 R |
| 4,781,156 | 11/1988 | Berger et al. | 123/192 R |
| 4,852,533 | 8/1989 | Doncker et al. | 123/192 R |
| 5,058,453 | 10/1991 | Graham et al. | 74/574 |

FOREIGN PATENT DOCUMENTS

| | | | |
|---|---|---|---|
| 2521 107 | 11/1975 | Germany | 74/574 |
| 3433797 | 3/1986 | Germany | F16F 13/00 |
| 3529687 | 3/1987 | Germany | 74/574 |
| 61-226525 | 10/1986 | Japan | F02B 53/00 |
| 182650 | 7/1989 | Japan | 74/574 |
| 1016914 | 1/1966 | United Kingdom . | |
| 1460381 | 1/1977 | United Kingdom | B05D 1/04 |
| 94/29581 | 12/1994 | WIPO | F02B 75/06 |

Primary Examiner—Noah P. Kamen
Attorney, Agent, or Firm—Fred Baehr

[57] ABSTRACT

A combined axial and torsional crankshaft vibration damper for reciprocating engines comprising a hub fastened to a crankshaft and a inertia ring connected to the hub by a material that transmits a portion of the vibratory movement of the crankshaft to the inertia ring which tends to continue constant rotational movement and resists the vibrational movement and dampens the axial and torsional vibration of the crankshaft.

2 Claims, 2 Drawing Sheets

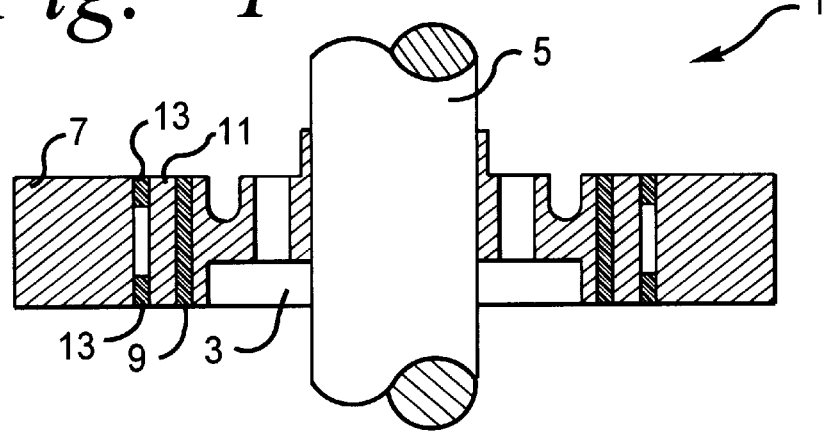
*Fig. - 1 -*
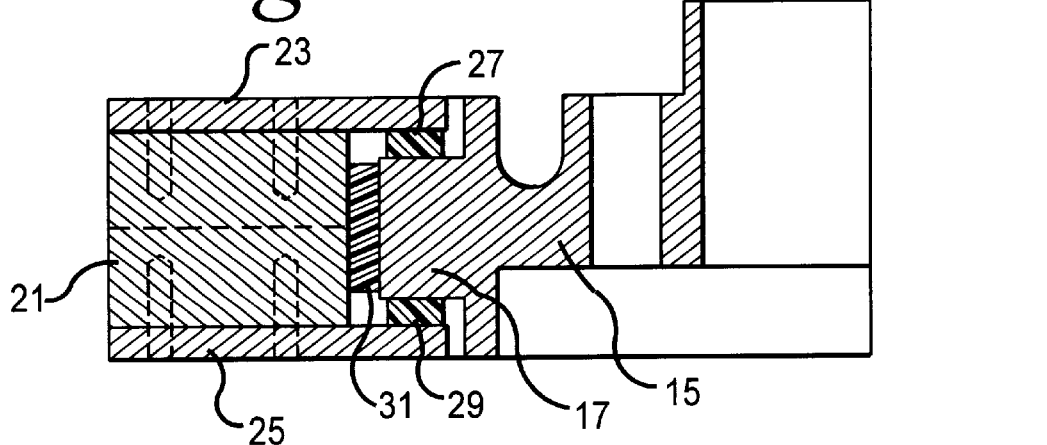
*Fig. - 2 -*
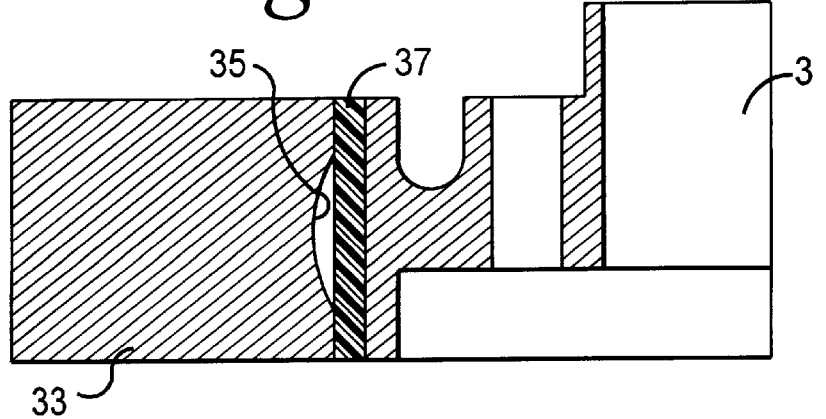
*Fig. - 3 -*

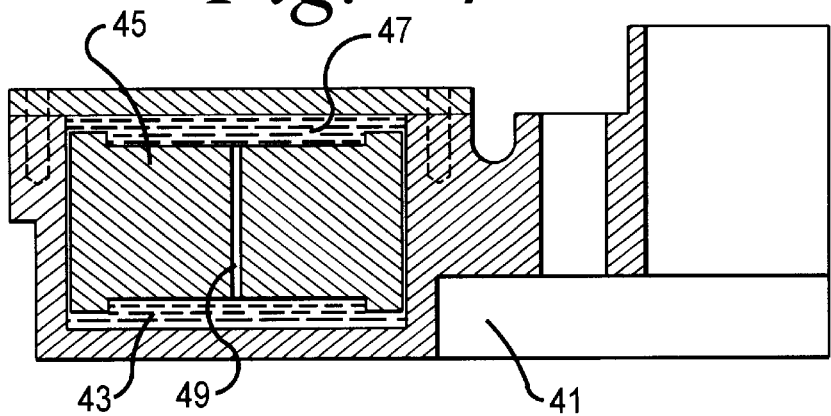
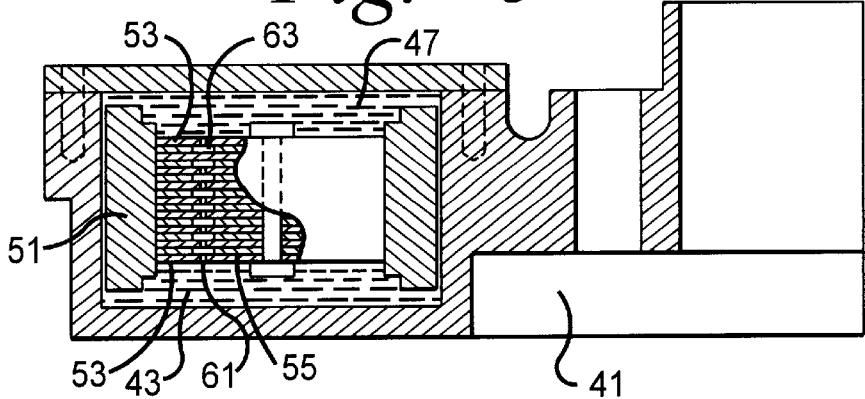
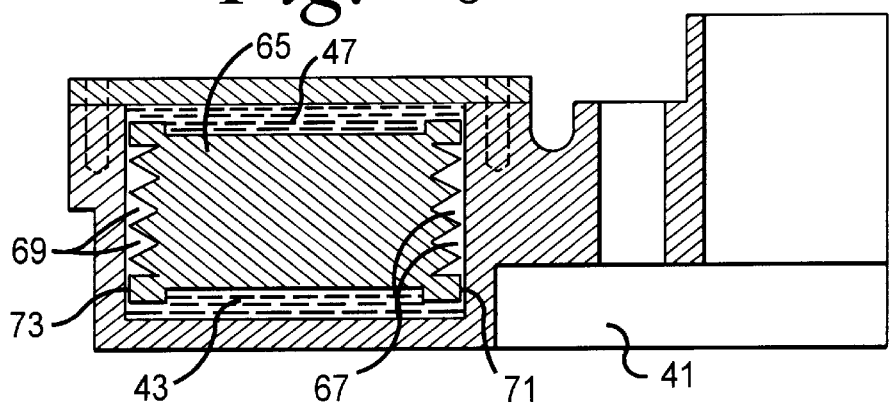

COMBINED AXIAL AND TORSIONAL CRANKSHAFT VIBRATION DAMPER FOR RECIPROCATING ENGINE

TECHNICAL FIELD

The invention relates to a vibration damper and more particularly to a combined axial and torsional crankshaft vibration damper for a reciprocating engine.

BACKGROUND ART

The increased emphasis on improving power density and first cost of internal combustion engines has led to increased running speed, increased piston stroke and increased peak firing pressures of combustion with in the cylinders. These improvements tend to place the crankshaft under increasingly higher stress and vibratory torque.

Increased running speed places the internal combustion engine crankshaft under higher stress due to higher inertial loading as well as bringing previously excluded natural modes of vibration within the new higher operating speed range of the engine.

Increasing the piston stroke of the engine enlarges the engine's displacement and its power output. However the crankshafts pins or throws must be set further from the central supporting main journals to achieve the increased stroke. The lengthening of the crankshaft support geometry to carry pin loads makes the crankshaft more flexible and weaker.

In the past only very large internal combustion engines with piston bore diameters above 300 millimeters were under much risk from crankshaft failure due to axial vibration. Crankshaft axial vibration is a mode of vibration resulting from the crankshaft expanding and compressing along its axis of rotation. This mode of vibration affects the crankshaft cheeks or pin throws. The cheek is that part of the crankshaft connecting the main journals with the eccentrically mounted pins. The U shape of the cheeks and pins extending from the main journals make the cheeks susceptible to vibration toward and away from the middle of the "U's", much like a "U" shaped tuning fork. Typically the comparatively short, stiff and low weight crankshafts of engines with less than 300 millimeter piston bores lacked problems with axial modes of vibration. The stiffness and light weight of heretofore made small crankshafts predetermined them to have comparatively high natural frequencies, which were well above frequencies excited at the engines highest operating speed.

Internal combustion engine crankshafts must also endure high torsional vibrations. Since internal combustion engines do not produce smooth power and experiences positive and negative speed fluctuations within each revolution of the crankshaft. Normally the engine is equipped with a flywheel to smooth the torque and speed fluctuations, which would otherwise be more significantly present in the engine drive line. When the engine revolves subcomponents and segments about the crankshaft centerline as well as subcomponents and segments of any driven piece of equipment, there is always certain rotational flexibility between successive rotating masses. The flexibility existing between the rotating masses of the engine drive line allow for slight angular deflections to propagate among, between and through the engine drive line. This angular vibration makes the internal combustion engine experience torsional vibrations between the drive line masses.

Torsional vibrations and/or axial vibrations present within an internal combustion engine may not be acceptable. As these vibrations may lead to infinitely high stress resonance conditions, which cause parts to catastrophically fail or may be unacceptable for customer stipulated reasons or perceptions.

British Patent 1,016,914 describes a cylinder connected to the engine block and having pressurized lubrication oil supplied to both sides of a piston disposed in the cylinder and connected to the crankshaft to dampen axial vibrations.

DISCLOSURE OF THE INVENTION

In general, a combined axial and torsional crankshaft vibration damper for a reciprocating engine when made in accordance with this invention, comprises a hub portion fastened to the crankshaft and an inertia ring connected to the hub portion by a material causing the inertia ring to rotate at the present average speed of the crankshaft and absorb a portion of the axial and torsional vibrational movement of the crankshaft relative to the inertia ring. The inertia ring tries to continue constant rotational motion producing a resistance to the transmitted vibrational movement of the crankshaft transmitted to the inertia ring through the material. A portion of the resistance of the inertia ring is transmitted back to the crankshaft by the material dampening the axial and torsional vibrations of the crankshaft.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

FIG. 1 is a sectional view of a combined axial and torsional crankshaft vibration damper;

FIG. 2 a partial sectional view of an alternative embodiment;

FIG. 3 a partial sectional view of an alternative embodiment;

FIG. 4 a partial sectional view of an alternative embodiment;

FIG. 5 a partial sectional view of an alternative embodiment; and

FIG. 6 a partial sectional view of an alternative embodiment.

BEST MODE FOR CARRYING OUT THE INVENTION

Referring now to the drawings in detail and in particular to FIG. 1, there is shown a combined axial and torsional crankshaft vibration damper 1 for a reciprocating engine (not shown) comprising a hub portion 3 connected to a crankshaft 5 and an inertia ring 7. The inertia ring 7 is connected to the hub portion 3 by a flat ring 9 made of an elastomer material, which is bonded to and compressed between the hub portion 3 and a thin metal ring 11. Two spaced apart flat rings 13 made of the elastomer material are bonded to and compressed between the thin metal ring 11 and the inertia ring 7. The elastomer rings 9 and 13 provide sufficient flexibility between the inertia ring 7 and the hub 3 to allow the inertia ring to rotate at the present average speed of the crankshaft 5, which varies in speed within one single revolution. The elastomer rings 9 and 13 also absorb a portion of the axial and torsional vibratory movement of the crankshaft 5 relative to the inertia ring 7, which tries to maintain or continue constant rotational motion. Thus, the inertia ring 7 resists any motion changes transmitted via the elastomer rings 9 and 13 and moves to a lesser degree. The resistance of the inertia ring 7 is transmitted back to the crankshaft 5 by the elastomer rings 9 and 13 to dampen the axial and torsional vibrations of the crankshaft 5. Changing the thickness and formulation of the elastomer ring 9 affects torsional damping more than axial damping. While changing the thickness and formulation of the elastomer rings 13 affects axial damping more than torsional damping. The elastomer rings 9 and 13 are formulated to hold up when subjected to repeated shear stresses and may have different stiffness.

Referring now to FIG. 2 in detail there is shown a hub 15 having an outer peripheral ring 17 with a rectangular cross section and an inertia ring 21 having a plate 23 and 25 fastened on opposite sides thereof. The plates 23 and 25 extend over the outer peripheral ring 17 with a space between the ring 17 the plates 23 and 25 and the inertia ring 21. Elastomer rings 27, 29 and 31 are disposed on three sides of the outer peripheral ring 17, the plates 23 and 25 and the inertia ring 21. It is not required that the elastomer rings 27, 29 and 31 be bonded to the hub 15 or to the inertia ring 21. The elastomer rings 27, 29 and 31 are shown as separate, but it is understood that they may be made integral and have different formulation and thickness. The side elastomer rings 27 and 29 have a major affect on the degree of axial damping and the ring 31 has a major affect on torsional vibration. The elastomer rings 27, 29 and 31 cooperate with the hub 15 and inertia ring 21 to dampen axial and torsional crankshaft vibrations.

Referring now to FIG. 3 there is shown a hub 3 having a inertia ring 33 with a centrally disposed circumferential groove 35 disposed adjacent the hub 3. An elastomer ring 37 is disposed between the hub 3 and the inertia ring 33. The elastomer ring is bonded to and compressed between the hub 3 and the inertia ring 33 outboard of the groove 35 and cooperates therewith to dampen axial and torsional crankshaft vibrations. The amount of axial and torsional vibration dampened may be varied by changing the width of the groove 35 and the thickness and formulation of the elastomer ring 37.

Referring now to FIG. 4 in detail there is shown a hub 41 having a circumferential chamber 43 that receives an inertia ring 45. There is clearance between the inertia ring 45 and the chamber 43. A viscous fluid material 47 fills the clearance between the inertia ring 45 and the chamber 43. There is at least one hole 49 extending through the inertia ring 45. As the hub 41 rotates with the crankshaft 5 the viscous fluid 47 shears, but transfers the rotating energy from the hub to the inertia ring 45 which reaches the present average speed of the crankshaft 5. A portion of the axial and torsional movement of the crankshaft 5 relative to the inertia ring 45 is transmitted through the viscous fluid 47 to the inertia ring 45. The inertia ring tries to maintain constant rotational motion and resists the transmitted vibrational movement of the crankshaft 5. The resistance of the inertia ring 45 is transmitted back to the crankshaft 5 through the viscous fluid 47 to dampen the axial and torsional vibration of the crankshaft 5. The viscosity of the fluid 47 and the clearance between the chamber 43 and the inertia ring 45 affect the degree of torsional damping. And the size and/or number of the holes and the viscosity of the viscous fluid 47 cooperate to control the period and magnitude of pressure differential between opposite sides of the inertia ring 45 and thereby control the degree axial damping.

Referring now to FIG. 5 there is shown a hub 41 having a circumferential chamber 43 that receives an inertia ring 51. There is clearance between the inertia ring 51 and the chamber 43. A viscous fluid material 47 fills the clearance between the inertia ring 51 and the chamber 43. The inertia ring 51 comprises a plurality of disks 53 and 55 stacked one against another and fastened together. Outboard disks 53 are welded to inner and outer rings 57 and 59. The disks 53 and 55 have at least one through hole formed by aligning holes 61 and 63 in adjacent disks 53 and 55. The disks 53 have a small hole 61 and are disposed adjacent the disks 55, which have a large hole 63 forming a labyrinth to control the period and magnitude of pressure differential between opposite sides of the inertia ring 51 and thereby control the degree of axial damping.

Referring now to FIG. 6 there is shown a hub 41 having a circumferential chamber 43 that receives an inertia ring 65. There is clearance between the inertia ring 65 and the chamber 43. A viscous fluid material 47 fills the clearance between the inertia ring 65 and the chamber 43. The inertia ring 65 comprises a plurality of grooves 67 and 69 on radial inner and radial outer surfaces 71 and 73 of the inertia ring 65 forming a labyrinth. The labyrinths provide a high pressure differential between opposite sides of the inertia ring 65 with larger radial clearance between the chamber 43 and the inner and outer surfaces 71 and 73 of the inertia ring 65.

INDUSTRIAL APPLICABILITY

The combined axial and torsional vibration damper 1 for reciprocating engine has the hub 3, 15 or 41 connected to the crankshaft 5 and an inertia ring 7, 21, 33, 45, 51 or 65 connected to the hub 3, 15 or 41 by a material that transmits a portion of the vibratory movement of the crankshaft 5 to the inertia ring 7, 21, 33, 45, 51 or 65, which tends to continue constant rotational movement and resists the vibrational movement. This resistance is transmitted back to the hub 3, 7 or 41 through the material to dampen the axial and torsional vibration of the crankshaft 5.

The axial and torsional damper 1 can be made smaller, more durable and cheaper. It also provides improved serviceability and inspection of the axial and torsional vibration damper by placing it outside the engine block.

While the preferred embodiments described herein set forth the best mode to practice this invention presently contemplated by the inventor, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

What is claimed is:

1. A combined axial and torsional crankshaft vibration damper for a crankshaft of a reciprocating engine comprising a hub portion fastened to said crankshaft, an inertia ring, a thin metal ring disposed between said hub and said inertia ring, a ring of elastomer material disposed between said hub and said thin metal ring being bonded thereto and compressed therebetween, and two spaced apart rings of the elastomer material disposed between said thin ring and said inertia ring and being bonded thereto and compressed therebetween, the elastomer material having elastic properties that will withstand repeated shear stresses with out failure and wherein changing thickness and stiffness change the degree of camshaft axial and torsional vibration damping said inertia ring, said thin metal ring and said hub portion cooperating with said elatomer material to cause said inertia ring to rotate at a present average speed of said crankshaft and absorb a portion of an axial and torsional vibrational movement of said crankshaft relative to said inertia ring, said inertia ring trying to continue a constant rotational motion producing a resistance to said transmitted vibrational movement of said crankshaft transmitted to said inertia ring through said elastomer material, a portion of said resistance of said inertia ring being transmitted back to said crankshaft by said elastomer material dampening axial and torsional vibrations of said crankshaft.

2. An internal combustion engine comprising a crankshaft and a combined axial and torsional vibration damper disposed on the crankshaft, the combined axial and torsional vibration damper having a hub portion fastened to said crankshaft, an inertia ring, a thin metal ring disposed between said hub and said inertia ring, a ring of elastomer material disposed between said hub and said thin metal ring being bonded thereto and compressed therebetween, and two spaced apart rings of the elastomer material disposed between said thin ring and said inertia ring and being bonded thereto and compressed therebetween, the elastomer material having elastic properties that will withstand repeated shear stresses with out failure and wherein changing thickness and stiffness change the degree of camshaft axial and torsional vibration damping, said inertia ring, said thin metal ring and said hub portion cooperating with said elastomer material to cause said inertia ring to rotate at a present average speed of said crankshaft and absorb a portion of an axial and torsional vibrational movement of said crankshaft relative to said inertia ring, said inertia ring trying to continue a constant rotational motion producing a resistance to said transmitted vibrational movement of said crankshaft transmitted to said inertia ring through said elastomer material, a portion of said resistance of said inertia ring being transmitted back to said crankshaft by said elastomer material dampening axial and torsional vibrations of said crankshaft.

* * * * *